US012572874B2

(12) United States Patent
Lairsey et al.

(10) Patent No.: US 12,572,874 B2
(45) Date of Patent: Mar. 10, 2026

(54) SYSTEM FOR ENTERPRISE LEVEL BENCHMARKS

(71) Applicant: Dell Products L.P., Round Rock, TX (US)

(72) Inventors: Jeffrey Morgan Lairsey, Round Rock, TX (US); Rhushabh Bhandari, Pflugerville, TX (US); Manish Giri, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 27 days.

(21) Appl. No.: 18/646,608

(22) Filed: Apr. 25, 2024

(65) Prior Publication Data

US 2025/0335859 A1     Oct. 30, 2025

(51) Int. Cl.
G06Q 10/0639     (2023.01)

(52) U.S. Cl.
CPC .............................. G06Q 10/06393 (2013.01)

(58) Field of Classification Search
CPC .......................................... G06Q 10/00–50/00
USPC ................................................ 705/7.11–7.42
See application file for complete search history.

(56) References Cited

U.S. PATENT DOCUMENTS

| | | | | |
|---|---|---|---|---|
| 11,869,015 B1 * | 1/2024 | Fradkin | .............. | G06Q 30/0631 |
| 2003/0212518 A1 * | 11/2003 | D'Alessandro | .. | G06Q 10/06393 705/7.39 |

| | | | | |
|---|---|---|---|---|
| 2005/0102176 A1 * | 5/2005 | Burchfield | ............. | G06Q 99/00 705/400 |
| 2013/0124269 A1 * | 5/2013 | Dunning | .......... | G06Q 10/06393 705/7.39 |
| 2014/0223176 A1 * | 8/2014 | Hajost | .................... | H04L 63/20 713/165 |
| 2015/0019707 A1 * | 1/2015 | Raghunathan | ...... | G06F 11/3495 709/224 |
| 2017/0075942 A1 * | 3/2017 | Childs | ................... | G06F 12/023 |
| 2017/0351991 A1 * | 12/2017 | Halberstadt | ......... | G06F 16/2365 |
| 2020/0202478 A1 * | 6/2020 | Thumpudi | ................ | G06T 5/80 |
| 2021/0027231 A1 * | 1/2021 | Ruble | .............. | G06Q 10/06393 |
| 2021/0194929 A1 * | 6/2021 | Garrett | .................. | G06F 21/577 |
| 2021/0344612 A1 * | 11/2021 | Files | .................... | H04L 67/535 |
| 2021/0352112 A1 * | 11/2021 | Hajost | .................... | H04L 63/20 |
| 2021/0390028 A1 * | 12/2021 | Schmitz | ............. | G06F 11/3428 |
| 2022/0006746 A1 * | 1/2022 | Martin | ................... | G16H 40/67 |

(Continued)

*Primary Examiner* — Alan S Miller
(74) *Attorney, Agent, or Firm* — WOMBLE BOND DICKINSON (US) LLP

(57)     ABSTRACT

Methods, systems, and devices for managing operation of a data processing system that provides computer implemented services. To manage the operation of the data processing system, telemetry data for the data processing system, filtering data indicating client ascribed levels of significance to benchmarks, and client ascribed field of use data for the data processing system may be obtained. Based on the telemetry data and benchmark criteria, the benchmarks for the data processing system may also be obtained. The benchmarks may be filtered based on the filtering data to obtain filtered benchmark data. Based on the filtered benchmark data and the client ascribed field of use data, update data may be obtained for the data processing system. Update of the operation of the data processing system may be initiated using the update data to obtain an updated data processing system that provides updated computer implemented services.

20 Claims, 7 Drawing Sheets

(56) References Cited

U.S. PATENT DOCUMENTS

| | | | |
|---|---|---|---|
| 2023/0040834 A1* | 2/2023 | Haile | G06F 16/26 |
| 2023/0315078 A1* | 10/2023 | Sepulveda | G05B 23/027 |
| 2024/0179545 A1* | 5/2024 | Manku | H04W 24/08 |
| 2024/0184743 A1* | 6/2024 | Ramachandran | G06F 16/122 |

* cited by examiner

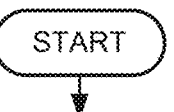

Telemetry data for the data processing system, filtering data indicating client ascribed levels of significance to benchmarks, and client ascribed field of use data for the data processing system is obtained.
Operation 300

The benchmarks for the data processing system are obtained based on the telemetry data and benchmark criteria.
Operation 302

The benchmarks are filtered based on the filtering data to obtain filtered benchmark data.
Operation 304

Update data for the data processing system is obtained based on the filtered benchmark data and the client ascribed field of use data.
Operation 306

Update of operation of the data processing system is initiated to obtain an updated data processing system that provides updated computer implemented services.
Operation 308

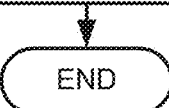

FIG. 3

SYSTEM FOR ENTERPRISE LEVEL BENCHMARKS

FIELD

Embodiments disclosed herein relate generally to management of data processing systems. More particularly, embodiments disclosed herein relate to systems and methods for updating operation of a data processing system.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 3 shows a flow diagram illustrating a method for managing operation of a data processing system in accordance with an embodiment.

DETAILED DESCRIPTION

Figure 1:
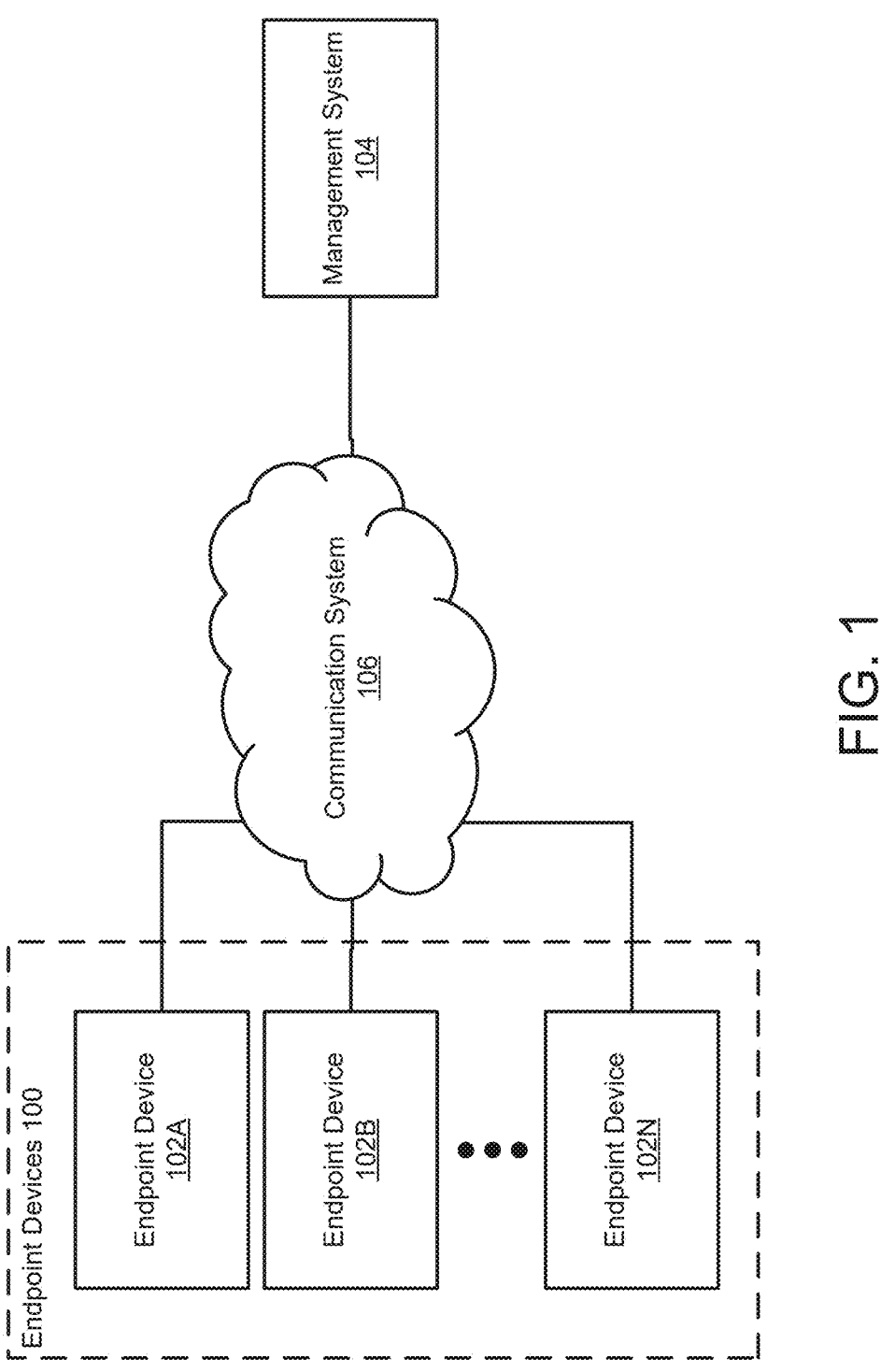
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operations of data processing systems that may provide, at least in part, computer implemented services. The computer implemented services may be provided to any type and/or number of other devices and/or users of the data processing systems. Furthermore, the provided computer implemented services may be of any quantity and/or type of such services.

To provide the computer implemented services, the data processing systems may include hardware and/or software components. Operation of these hardware and/or software components may facilitate various functionalities of a data processing system, thereby causing the computer implemented services to be provided by the data processing system.

Additionally, to provide specific computer implemented services, the hardware and/or software components may be configured to operate in desirable conditions that are required to do so. By configuring the hardware and/or software components to operate in the desirable conditions, functionalities of the data processing system may be facilitated in a manner conducive to providing a specific service. Thus, the data processing system may be placed in a desirable condition to provide the specific service.

To provide a level of assurance indicating that hardware and/or software components are configured to be in desirable conditions, any number of benchmarks may be used to determine how many (if any) of the hardware and/or software components coincide with the desirable conditions.

However, processes for obtaining benchmarks (and the benchmarks themselves) may have low relevancy with regard to the industry sector in which the data processing system operates. Consequently, using benchmarks less relevant to the industry sector in which the data processing system operates may decrease a likelihood of the data processing system providing desired computer implemented services compared to using benchmarks that may be more relevant.

To manage operation of the data processing system, a management system in accordance with an embodiment may initiate update a data processing system based on benchmarks being filtered based on client ascribed levels of significance. Consequently, updating the data processing system based on these filtered benchmarks may increase the likelihood of providing services relevant to an industry sector associated with the client and which the data processing system is likely to operate in.

In an embodiment, a method for managing operation of a data processing system that provides computer implemented services is provided.

The method may include obtaining telemetry data for the data processing system, filtering data indicating client ascribed levels of significance to benchmarks, and client ascribed field of use data for the data processing system; obtaining, based on the telemetry data and benchmark criteria, the benchmarks for the data processing system; filtering, based on the filtering data, the benchmarks to obtain filtered benchmark data; obtaining, based on the filtered benchmark data and the client ascribed field of use data, update data for the data processing system; and initiating update of the operation of the data processing system to obtain an updated data processing system that provides updated computer implemented services.

The telemetry data may include at least one type of data selected from a group of types of data consisting of software data; and hardware data.

The software data may include software version compliance data; software security risks; and recent software alerts.

The hardware data may include component configuration data; component metrics; and recent hardware alerts.

The field of use data may indicate an industry in which the data processing system is used.

Filtering the benchmarks may include weighting the benchmarks based on the filtering data.

The update data may include actions to be performed to update the operation of the data processing system, the actions being associated with different filtered benchmarks of the filtered benchmark data; inferred changes in the benchmarks for each of the actions; and standards for the benchmarks for the field of use.

The standard benchmarks may be based on benchmark averages for entities within each field of use of fields of use for which the data processing system is usable.

Initiating the update may include sending the update data to a manager of operation of the data processing system.

Performing the update may include obtaining, by the manager, the update data; obtaining, by the manager and based on the update data, user feedback regarding performance of the update; performing, by the manager and based on the user feedback, the actions to be performed to update the operation; and obtaining, by the manager, the updated data processing system.

In an embodiment, a non-transitory media is provided. The non-transitory media may include instructions that when executed by a processor cause, at least in part, the computer-implemented method to be performed.

In an embodiment, a data processing system is provided. The data processing system may include the non-transitory media and a processor and may, at least in part, perform the method when the computer instructions are executed by the processor.

Turning to FIG. 1, a block diagram illustrating a system in accordance with an embodiment is shown. The system shown in FIG. 1 may be a distributed system that provides for management of data processing systems that may provide, at least in part, computer implemented services.

The computer implemented services may include any type and quantity of computer implemented services. The computer implemented services may include, for example, database services, data processing services, electronic communication services, and/or any other services that may be provided using one or more computing devices. The computer implemented services may be provided by, for example, any portion of endpoint devices 100 (e.g., 102A-102N), management system 104, communication system 106, and/or any other type of devices (not shown in FIG. 1).

Other types of computer implemented services may be provided by the system shown in FIG. 1 without departing from embodiments disclosed herein.

To provide the computer implemented services, the data processing systems may include hardware and/or software components. Operation of these hardware and/or software components may facilitate various functionalities of a data processing system, thereby causing the computer implemented services to be provided by operation of the data processing system.

To provide a specific type and/or quantity of the computer implemented services, the hardware and/or software components may be configured to operate in conditions required to do so (to be referred to as "desirable conditions", the desirable conditions being relative to a corresponding service (e.g., a service associated with an industry sector in which the data processing system operates)). By configuring the hardware and/or software components to operate in the desirable conditions, functionalities of the data processing system may be facilitated in a manner conducive to providing the specific type and/or quantity of the computer implemented services. Thus, the data processing system may be placed in a desirable condition to provide such services.

For example, if a hardware and/or software component is not configured to operate in the desirable conditions, the data processing system may not operate in the desirable condition necessary for providing a service associated with an industry sector in which the data processing system operates. Consequently, the service may be delayed, may be prevented entirely, and/or may otherwise not be provided in a desirable manner.

To provide a level of assurance indicating that hardware and/or software components are configured to be in desirable conditions, any number of benchmarks may be obtained for the data processing system. These benchmarks may be used to determine how many (if any) of the hardware and/or software components coincide with the desirable conditions.

However, processes for obtaining benchmarks (and the benchmarks themselves) may have low relevancy with regard to the industry sector in which the data processing system operates. For example, benchmarks obtained based on operations performed by graphical processing units (GPUs) may not be as relevant to an entity (e.g., a bank) that provides banking services as would benchmarks obtained based on performance of data storage devices (e.g., storage devices that store bank account information for clients).

Consequently, using benchmarks less relevant to the industry sector in which the data processing system operates (and thus, less relevant to the data processing system itself) may decrease a likelihood of the data processing system providing desired computer implemented services compared to using benchmarks that may be more relevant.

In general, embodiments disclosed herein relate to systems, devices, and methods for improving a likelihood of data processing systems being able to provide desired computer implemented services (e.g., services relevant to an industry sector in which the data processing systems operate). To do so, various processes may be used to update a data processing system based on benchmarks being filtered based on client ascribed levels of significance. Consequently, updating the data processing system based on these filtered benchmarks may increase the likelihood of providing services relevant to an industry sector associated with the client and which the data processing system is likely to operate in.

To provide the above noted functionality, the system of FIG. 1 may include endpoint devices 100 (endpoint device 102A-102N), management system 104, and communication system 106. Each of which is discussed below.

Endpoint devices 100 may include any number of endpoint devices (e.g., 102A-102N). Any endpoint device of endpoint devices 100 may provide, at least in part, computer implemented services. To do so, for example, endpoint device 102A may (i) host hardware and/or software components adapted to facilitate various functionalities that contribute to providing computer implemented services, and/or (ii) obtain requests from a user (e.g., a client) and/or other entities to provide desired computer implemented services.

However, in some cases, for example, endpoint device 102A (and/or components thereof) may not be configured to operate in a desirable condition conducive to providing the desired computer implemented services as requested. Therefore, a benchmark-based update process may be performed (i) to place endpoint device 102A (and components thereof) in the desirable condition, and/or (ii) verify that endpoint device 102 (and components thereof) is in the desirable condition.

Although often referred to as a singular desirable condition, it will be appreciated that the desirable condition may be one of many desirable conditions and/or may encompass information regarding any and/or all desirable conditions conducive to providing the desired computer implemented services.

To perform the benchmark-based update process, endpoint device 102A may perform its previously listed functionalities, as well as (iii) provide information associated with various operating states of endpoint device 102A to, for example, management system 104, (iv) obtain one or more recommendations regarding possible modification (e.g., update) of a current operating state of endpoint device 102A, for example, from management system 104, (v) provide the one or more recommendations to an administrator of endpoint device 102A and/or another entity, (vi) facilitate, at least in part, an update process based on the one or more recommendations to obtain an updated data processing system (e.g., an updated endpoint device 102A) that may provide updated computer implemented service that have an increased likelihood of coinciding with the desired computer implemented services, and/or (viii) perform other processes that may otherwise cause services (with the increase likelihood of coinciding with the desired computer implemented services) to be provided.

As mentioned above, management system 104 may provide functionalities that further perform the benchmark-based update process (e.g., for endpoint device 102A) to increase the likelihood of providing the desired computer implemented services as requested. These functionalities may include (i) obtaining the information associated with various operating states of endpoint device 102A, (ii) performing a benchmarking process based on the obtained information to obtain filtered benchmarks, (iii), based on the filtered benchmarks, obtaining one or more recommendations for placing endpoint device 102A in the desirable condition and/or verifying that endpoint device 102A is in the desirable condition, (iv) facilitating, at least in part, the update process, and/or (v) performing other processes.

It will be appreciated that the update process may include processes facilitated by a user (e.g., administrator) of endpoint device 102A that may be based on the benchmarking process. For additional information regarding the update process, refer to FIGS. 2C-2D.

Figure 2A:
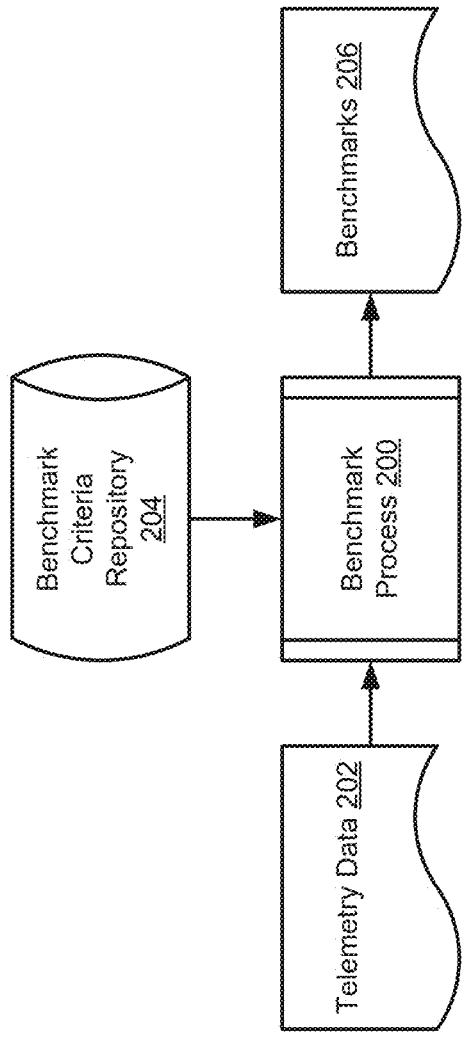
FIGS. 2A-2D show data flow diagrams illustrating methods for managing operation of a data processing system in accordance with an embodiment.
Figure 2B:
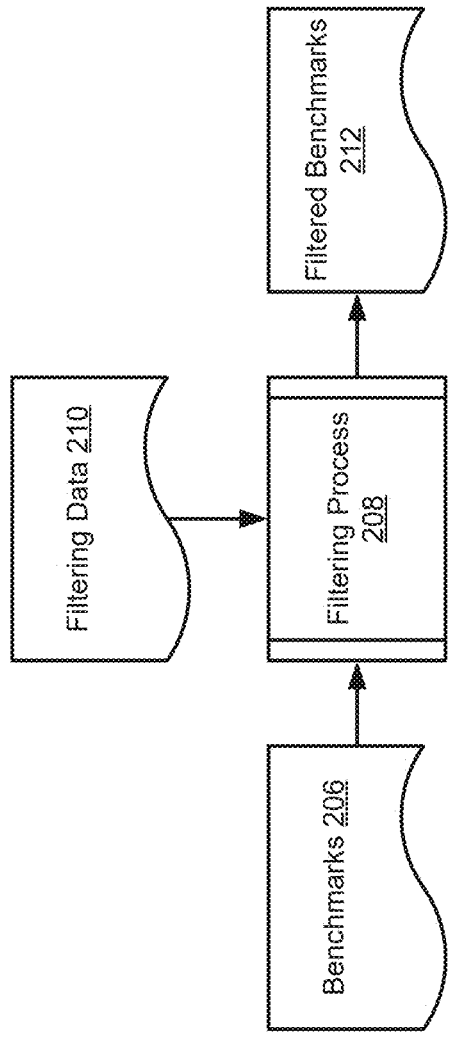
Figure 2C:
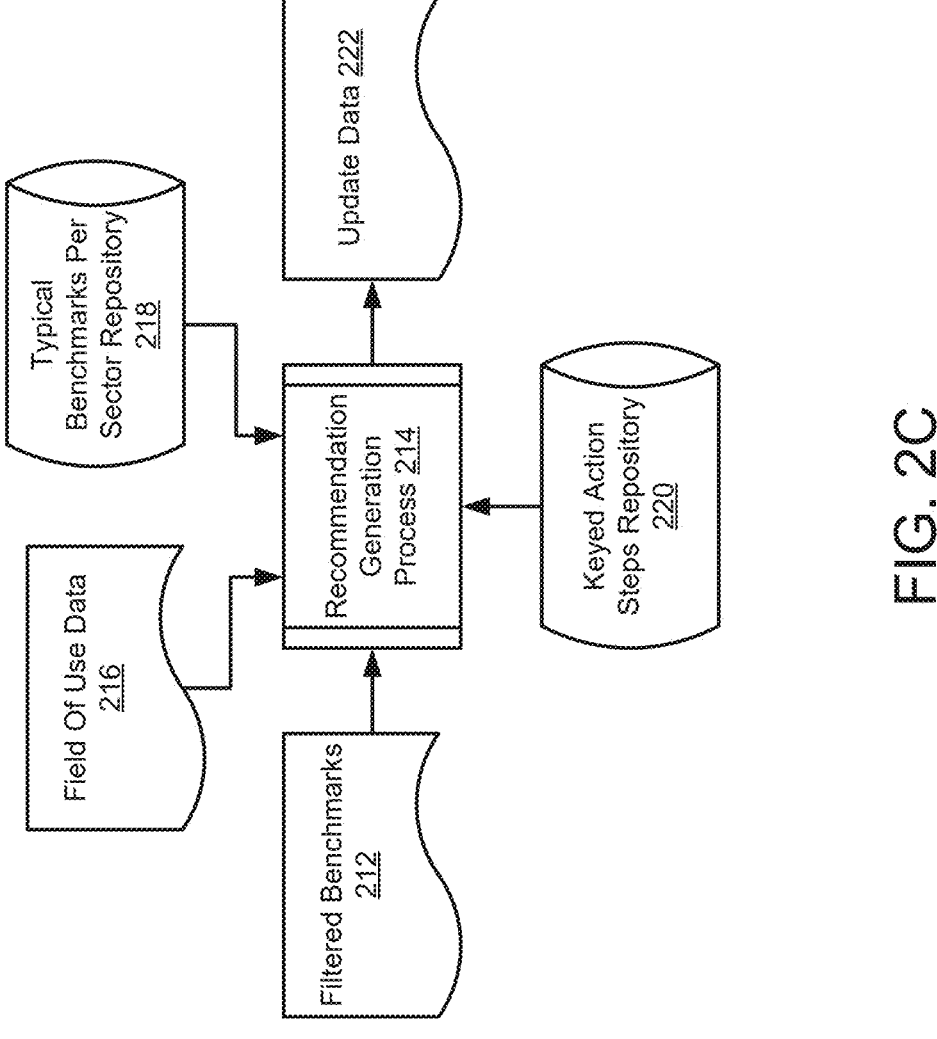

For additional information regarding the benchmarking process, refer to FIGS. 2A-2C.

When providing their functionality, any endpoint device (e.g., 102A-102N) included in endpoint devices 100 and/or management system 104 may perform all, or a portion, of the method shown in FIG. 3.

Any of (and/or components thereof) these endpoint devices and/or management system 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 106. In an embodiment, communication system 106 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, data flow diagrams in accordance with an embodiment are shown in FIGS. 2A-2D. In these diagrams, flows of data and processing of data are illustrated using different sets of shapes. A first set of shapes (e.g., 202, 206, 210, etc.) is used to represent data structures, a second set of shapes (e.g., 200, 208, etc.) is used to represent processes performed using and/or that generate data, and a third set of shapes (e.g., 204, 218, 220, etc.) is used to represent large scale data structures such as databases.

Additionally, it will be appreciated that within the first set of shapes, a first portion (e.g., 202, 216, etc.) of the first set of shapes may represent data which has yet to be obtained (e.g., and therefore, yet to be structured into a usable format) by the data processing system. A second portion of the first set of shapes (e.g., 222, 234, etc.) may represent data structures in usable format. Additionally, in some cases, some of the second portion may be based on some of the first portion. For example, benchmarks 206 may be based on telemetry data 202, discussed below with regard to FIG. 2A.

Turning to FIG. 2A, a first data flow diagram in accordance with an embodiment is shown. The first data flow diagram may illustrate data used in, and data processing performed in, obtaining benchmarks for a data processing system (e.g., Any of 102A-102N).

To obtain the benchmarks, benchmark process 200 may be performed. During benchmark process 200, (i) telemetry data 202 may be ingested into benchmark process 200 based on initiation of the benchmark-based update process for, for example, endpoint device 102A, (ii) databases (e.g., data repositories) such as benchmark criteria repository 204 may also be, at least in part, ingested into benchmark process 200, and (iii) benchmarks 206 may be outputted based on any and/or all data ingested into benchmark process 200.

For example, assume endpoint device 102A is a data processing system operating in an industry sector such as the health care industry. Additionally, assume an administrator of endpoint device 102A has requested that a benchmark-based update process be performed for endpoint device 102A. Based on this request, for example, management system 104 may request telemetry data 202 from endpoint device 102A.

Telemetry data 202 may include, for example, software data and/or hardware data. For example, the software data may include (but is not limited to) data regarding software version compliance, software security risks, and/or recent alerts associated with software hosted by endpoint device 102A. The hardware data may include (but is also not limited to) data regarding component configuration, component metrics, and/or recent alerts associated with hardware of, and/or hardware operably connected to, endpoint device 102A.

It will be appreciated that telemetry data 202 may include data that, for example, may otherwise indicate (and in some cases, specify) past conditions (e.g., ranging from recent conditions to not-so-recent conditions) of endpoint device 102A in addition to a current condition of endpoint device 102A.

Once obtained, management system 104 may, for example, compare telemetry data 202 to at least a portion of benchmark criteria repository 204.

Benchmark criteria repository 204 may include any type and/or quantity of information regarding standards of operation for data processing systems to follow as dictated by manufacturers of said data processing systems. These standards of operation may each be keyed to one or more associated processes of the data processing system. For example, each of these standards may be linked to an identifier, thereby facilitating relevant comparisons between telemetry data 202 and the at least a portion of benchmark criteria repository 204. For example, a manufacturer may determine that a first standard of the standards of operation is keyed to processing performance. This first standard may indicate that processing speeds between 1.8 GHz and 3.2 GHz are optimal for the data processing system. This first standard may be included in benchmark criteria repository 204.

During benchmark process 200, tests may be performed to indicate, for example, a health state, efficiency, etc. of a data processing system such as endpoint device 102A. To do so, telemetry data 202 may be used during the testing, and the benchmarks obtained from the testing may be compared to the at least a portion of benchmark criteria repository 204. Thus, benchmarks 206 may be outputted and may thereby indicate, for example, the health state, efficiency, etc. of endpoint device 102A with respect to manufacturer standards.

Thus, using the data flow shown in FIG. 2A, benchmarks for a data processing system (e.g., 102A) may be obtained. These benchmarks may thereby indicate the health state, efficiency etc. of the data processing system. However, to obtain benchmarks that indicate information more relevant to the data processing system, benchmarks 206 may be filtered. For additional information regarding this filtering, refer to FIG. 2B below.

Turning to FIG. 2B, a second data flow diagram in accordance with an embodiment is shown. The second data flow diagram may illustrate data used in, and data processing performed in, obtaining filtered benchmarks (e.g., 212).

To obtain filtered benchmarks 212, for example, filtering process 208 may be performed. During filtering process 208, (i) benchmarks 206 may be ingested into filtering process 208, (ii) filtering data 210 may be ingested into filtering process 208, and (iii) filtered benchmarks 212 may be outputted based on any and/or all data ingested into filtering process 208.

Benchmarks 206 may be obtained as discussed with regard to FIG. 2A.

As mentioned previously, filtering data 210 may include information indicating client ascribed levels of significance to benchmarks, this significance being with respect to an industry sector of the client (and in which the data processing system may operate). Therefore, filtering data 210 may be used to obtain a first portion of benchmarks 206 that has a higher likelihood of being relevant to the industry sector of the client than a second portion of benchmarks 206 that may not be as relevant to the industry sector.

For example, this second portion of the benchmarks may be discriminated against during filtering process 208. Thus, filtered benchmarks 212 may be outputted from filtering process 208, filtered benchmarks 212 including the first portion of benchmarks 206, for example, and not including the second portion of benchmarks 206.

To filter these benchmarks, identifiers (similar to, if not the same as, the identifiers discussed with regard to FIG. 2A)

may be used. For example, these identifiers may be indicated, at least in part, by filtering data 210 and be keyed to various processes performable, at least in part, by the data processing system. By being keyed to the various processes, processes more likely to be relevant, as ascribed by the client, may be identified. To do so, the identifiers may be weighted based on the significance.

For example, assume a weighting scale that includes numerical values from 1 to 10. Identifiers keyed to processes more likely to be relevant may be weighted with numerical values closer to 10 (e.g., numerical values 6-10), while identifiers keyed to processes less likely to be relevant may be weighted with numerical values closer to 1 (e.g., 1-5). Thus, a weighting scale may be used to allow for variation in the significance ascribed by the client, thereby allowing for comprehensive tailoring of benchmarks with respect to the industry sector.

Refer to FIG. 2A for additional information regarding these example identifiers.

Thus, using the data flow shown in FIG. 2B, filtered benchmarks for a data processing system (e.g., 102A) may be obtained. These filtered benchmarks may thereby indicate information that is more likely to be relevant to the data processing system.

To obtain update data based on the filtered benchmarks, client ascribed field of use data may be used along with various repositories. For additional information regarding the update data, refer to FIGS. 2C-2D below.

Turning to FIG. 2C, a third data flow diagram in accordance with an embodiment is shown. The third data flow diagram may illustrate data used in, and data processing performed in, obtaining update data (e.g., 222).

To obtain update data 222, recommendation generation process 214 may be performed. During recommendation generation process 214, (i) filtered benchmarks 212 may be ingested into recommendation generation process 214, (ii) field of use data 216 may be ingested into recommendation generation process 214, (iii) at least a portion of typical benchmarks per sector repository 218 may be ingested into recommendation generation process 214, (iv) at least a portion of keyed action steps repository 220 may be ingested into recommendation generation process 214, and (v) update data 222 may be outputted based on any and/or all data ingested into recommendation generation process 214. For additional information regarding update data 222, refer to FIG. 2D further below.

Filtered benchmarks 212 may be obtained as discussed with regard to FIG. 2B.

Field of use data 216 may be data that indicates an industry in which the data processing system is used (e.g., the industry sector of the client discussed with regard to FIG. 2B). For example, a field of use may indicate an association with the health care industry. Therefore, the health care industry may be considered a "field of use" out of various fields of use. Another field of use of the fields of use may be the banking industry, for example. An additional field of use of the fields of use, for example, may be the retail industry. In other words, there may be any number of industry sectors from which the client may ascribe as being the field of use.

Typical benchmarks per sector repository 218 may be a database that includes information associated with each field of use of the fields of use. This information may include, for example, standard benchmarks per industry sector. These standard benchmarks may be based on benchmark averages for entities within each of the fields of use for which the data processing system is usable.

For example, assume a first, second, and third hospital each includes a respective data processing system that provides computer implemented services to a satisfaction of corresponding managers of said hospitals. Based on this satisfaction, assume the provided computer implemented services are desirable services that may be both relevant and useful to the health care industry. Therefore, benchmarks obtained from these respective data processing systems may be recorded and stored in typical benchmarks per sector repository 218 with an identifier indicating an association with the health care industry.

It will be appreciated that any of these benchmarks may be stored individually and/or may be used to calculate a single average benchmark for the associated industry sector with regard to one or more processes associated with the benchmark.

For example, based on the three hospitals, 3 benchmarks (per group of one or more processes performable by the data processing systems) may be used to obtain a single average benchmark. Thus, a number of average benchmarks may be stored to be used as standard benchmarks for the health care industry.

It will be appreciated that these standard benchmarks may be obtained and/or otherwise organized into their corresponding database (e.g., 218) using various processes not to be limited by embodiments herein.

Now assume, for example, that a manager of a fourth hospital requests performance of the benchmark-based update process on a data processing system (e.g., assume this is endpoint device 102A, previously discussed) of the fourth hospital. Using field of use data 216, the standard benchmarks stored in typical benchmarks per sector repository 218 that are associated with the health care industry may be identified (e.g., via a lookup process). These identified standard benchmarks may be used (e.g., compared to filtered benchmarks 212) to determine whether filtered benchmarks 212 indicate that endpoint device 102A is likely to provide useful and relevant services with regard to the health care industry.

To do so, differences between filtered benchmarks 212 and the standard benchmarks may be obtained. For example, a single filtered benchmark (e.g., associated with a first group of one or more processes performable by the data processing systems) from filtered benchmarks 212 may be compared to a single standard benchmark (e.g., also associated with the first group of one or more processes) from the standard benchmarks. Based on this comparison, a first difference may be obtained.

This first difference may indicate that (i) endpoint device 102A provides the useful and relevant services associated with the first group of one or more processes, or that (ii) endpoint device 102A does not provide the services associated with the first group of one or more processes in a manner that is useful and/or relevant enough with respect to the field of use (e.g., the health care industry).

For example, assume that the first difference indicates that these services are not useful and/or relevant enough with respect to the field of use. If this first difference is mitigated by management of endpoint device 102A, then operation of endpoint device 102A may be modified to more closely coincide with operations of the data processing systems of the first, second, and third hospitals. To do so, keyed action steps repository 220 may be used.

It will be appreciated that if indicated that endpoint device 102A provides the useful and relevant services, (i) no more actions may be performed to manage operation of endpoint device 102A, (ii) actions may be performed to notify the manager of endpoint device 102A that the useful and relevant services are capable of being provided by endpoint device 102A, or (iii) additional actions may be performed to enhance operation of endpoint device 102A with respect to the field of use with an understanding that the useful and relevant services are already capable of being provided by endpoint device 102A (the additional actions being discussed below with regard to if the services provided were not useful and/or relevant enough).

Keyed action steps repository 220 may be a database that includes actions steps keyed to various differences (e.g., the first difference) obtained based on comparisons between filtered benchmarks 212 and the standard benchmarks.

For example, assume the first group of one or more processes is related to processing speeds of data processing systems. To mitigate the first difference, a first action step may be obtained from keyed action steps repository 220 by identifying what action step is keyed to the first difference (e.g., via a lookup process).

To identify the first action step, for example, an identifier for the first group of one or more process (e.g., the one or more processes related to processing speeds) may be used to identify any and/or all differences between benchmarks associated with the first group of one or more processes within keyed action steps repository 220 (e.g., via a lookup process). Once identified, these differences may be searched through to identify the first difference, the first action step being obtained based on being keyed to the first difference.

This first action step may specify, for example, performable actions that when performed cause the first difference to be mitigated, thereby increasing a likelihood of processing speeds of endpoint device 102A to more closely coincide with processing speeds of the data processing systems of the first, second, and third hospitals.

This first action step may thereby be organized and/or otherwise processed (e.g., with other relevant data, to be discussed further below with regard to FIG. 2D) to obtain update data 222. In doing so, update data 222 may be provided to the manager of endpoint device 102A, thereby providing recommended performable actions for managing operation of endpoint device 102A that when performed may update operation of endpoint device 102A. Once updated, an updated endpoint device 102A may provide updated computer implemented services that are desirable to the manager of endpoint device 102A by being useful and relevant enough with respect to the field of use (e.g., the health care industry).

For additional information regarding update data 222 (e.g., data that may be included in update data 222), refer to FIG. 2D further below.

Thus, using the data flow shown in FIG. 2C, update data for a data processing system (e.g., 102A) may be obtained. This update data may be used to update operation of the data processing system. To initiate update of the operation of the data processing system, the update data may be provided to a manager of the data processing system (e.g., endpoint device 102A). For additional information regarding the update, refer to FIG. 2D below.

Figure 2D:
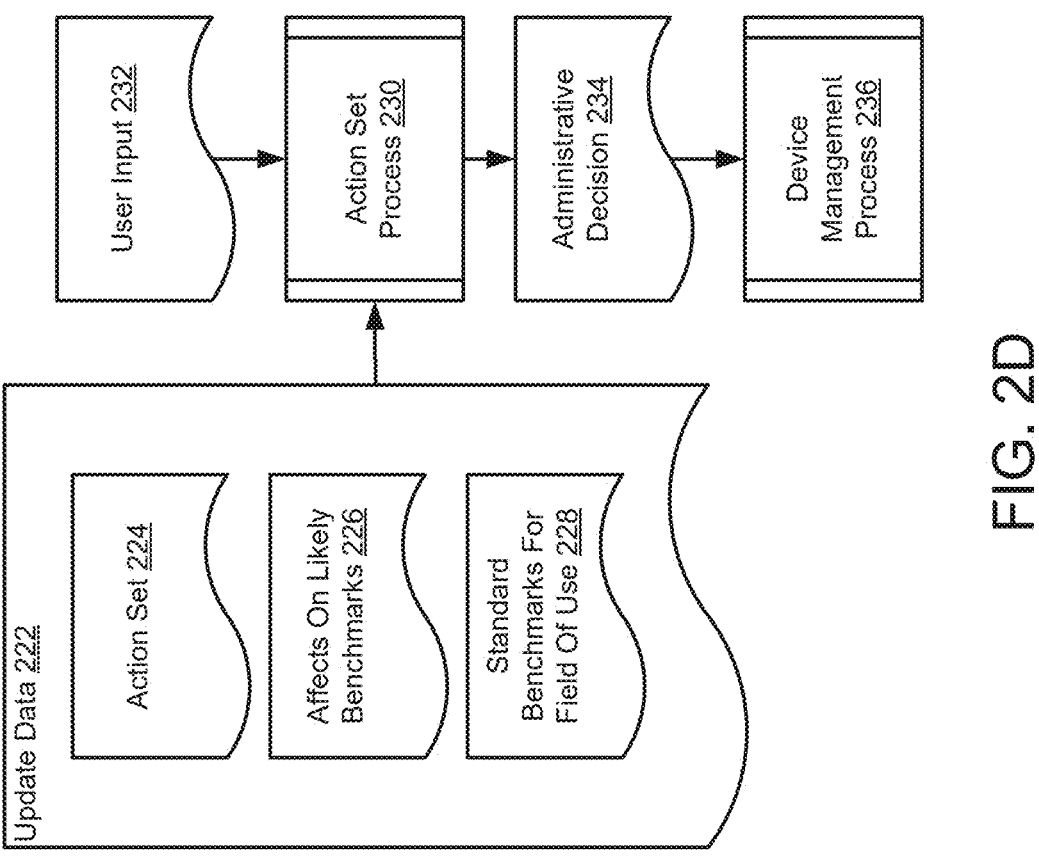

Turning to FIG. 2D, a fourth data flow diagram in accordance with an embodiment is shown. The fourth data flow diagram may illustrate data used in, and data processing performed in, updating operation of the data processing system.

To update the operation, device management process 236 may be performed based on performance of action set process 230.

During action set process 230, (i) update data 222 may be ingested into action set process 230, (ii) user input 232 may be ingested into actions set process 230, and (iii) administrative decision 234 may be outputted based on any and/or all data ingested into action set process 230, administrative decision 234 indicating, for example, a desired course of action of the manager of endpoint device 102A regarding the update. Administrative decision 234 may be ingested into device management process 236 to either end the update process or facilitate completion of the update.

As previously discussed with regard to FIG. 2C, update data 222 may include an action set (e.g., the first action set). This action set is illustrated in FIG. 2D as action set 224. Additionally, it will be appreciated that action set 224 may include any number of action steps performable to, at least in part, update the operation to increase the likelihood of providing desirable computer implemented services that are useful and relevant with regard to the field of use (e.g., the health care industry).

In addition to action set 224, update data 222 may include (i) effects on likely benchmarks 226 and (ii) standard benchmarks for field of use 228. Each of these is discussed below.

Effects on likely benchmarks 226 may include information regarding how performance of actions specified by action set 224 may change operation of endpoint device 102A, resulting in new benchmarks obtained based on the change. These new benchmarks may be different from benchmarks 206 and/or filtered benchmarks 212.

However, to obtain effects on likely benchmarks 226 before performance of at least a portion of action set 224, new telemetry data may be obtained (e.g., by being inferred). This new telemetry data may be based on ingestion of telemetry data 202 and action set 224 into, for example, an inference model. This inference model may be trained to ingest (i) data specifying an action such as performing a calculation, and (ii) one or more numerical values that are to be modified using the action. Both the action and the one or more numerical values may be associated with one or more processes performable by endpoint device 102A. The numerical values may be associated by, for example, representing a quality of the one or more processes (e.g., benchmarks) while the action may be associated by specifying performable operations that result in modifying the one or more processes.

This inference model may output the new telemetry data based on action set 224 specifying performable actions that when performed, change operation of hardware and/or software components of endpoint device 102A. By changing the operation of the hardware and/or the software components, the previously mentioned (with regard to FIG. 2A) software data and/or hardware data may be changed.

By changing the software data and/or the hardware data, endpoint device 102A may be placed in a new current state defined, at least in part, by the new telemetry data.

For example, both telemetry data 202 and the new telemetry data may include data that may otherwise indicate (and in some cases, specify) past conditions of endpoint device 102A in addition to the current condition of endpoint device 102A discussed with regard to FIG. 2A. However, due to being placed in the new current state, endpoint device 102A may provide the new telemetry data, the new telemetry data including data indicative of the past conditions (that would now include "the current condition" discussed with regard to FIG. 2A) in addition to the new current state.

Just as telemetry data 202 was ingested into benchmark process 200 to obtain benchmarks 206, the new telemetry data may be ingested into a similar and/or a same process as benchmark process 204 to obtain the new benchmarks.

These new benchmarks may then be filtered in a similar and/or same manner as described with regard to FIG. 2B to obtain new filtered benchmarks. These new filtered benchmarks and how they are obtained based on action set 224 may thus be included in effects on likely benchmarks 226.

It will be appreciated that although filtering process 208 is illustrated separately from benchmark process 200, filtering process 208 may be part (e.g., may be a sub-process) of benchmark process 200. Therefore, it will be appreciated that the new benchmarks may be filtered based on, for example, filtering data 210 during the sub-process of benchmark process 200, this sub-process being filtering process 208.

It will also be appreciated that because action set 224 is based on keyed action steps repository 220, the new filtered benchmarks are likely indicative of satisfactory capability for providing the desirable computer implemented services with regard to the field of use in which endpoint device 102A operates.

Furthermore, it will be appreciated that should the new filtered benchmarks not indicate the satisfactory capability, then a series of processes may be facilitated to remedy the situation by, for example, managing how the benchmark-based update process is performed.

For example, the less than satisfactory new filtered benchmarks and action set 224 may be labeled as problematic and recorded. This record may then be linked to any relevant sources of data such as keyed action steps repository 220 and/or may otherwise be made available to management system 104. A new action set may be obtained to replace action set 224, performance of this new action set, although different from action set 224, being likely to result in other new filtered benchmarks indicative of the satisfactory capability.

Consequently, other portions of update data 222 may be changed to reflect the new action set. By doing so, the benchmark-based update process may be continuously managed such that performance of the benchmark-based update process remains likely to increase the likelihood of providing the desirable computer implemented services with regard to the field of use.

Standard benchmarks for field of use 228 may include standard benchmarks associated with the same field of use as endpoint device 102A and/or individual benchmarks of one or more data processing systems (verified to have been providing desirable computer implemented services that may be both relevant and useful with regard to the field of use when the individual benchmarks were obtained) operating within the same field of use. Therefore, these standard benchmarks and/or individual benchmarks may indicate capability for providing the desirable computer implemented services.

Therefore, by providing update data 222 to the manager of endpoint device 102A, the manger may obtain information specifying (i) how to perform a set of actions to update endpoint device 102A, (ii) how performance of these actions may affect future benchmarks provided by endpoint device 102A, and/or (iii) what benchmarks indicate a satisfactory capability for providing the desirable computer implemented services associated with the field of use in which endpoint device 102A operates. Thus, by providing update data 222 to the manager of endpoint device 102A, update data 222 may be ingested into action set process 230.

It will be appreciated that action set process 230 may include manual processes performed by the manager as well as other processes simply facilitated by the manager.

Thus, using this information and during action set process 230, the manager may make a determination regarding whether to implement the set of actions in update data 222 to facilitate the update process. For example, assume that the manager decides to implement the set of actions. The manager may provide user input 232 (e.g., by interacting with a graphical user interface of endpoint device 102A, and user input 232 indicating a desire to perform the set of actions) to endpoint device 102A, thereby causing the ingestion of user input 232 into action set process 230. Based on this ingestion of user input 232, administrative decision 234 may be obtained.

Administrative decision 234 may include any and all data used to facilitate the update of endpoint device 102A as specified by update data 222. For example, administrative decision 234 may include a request (e.g., one or more executing and/or executable commands) for operation of endpoint device 102A to be modified based on update data 222.

Once obtained, administrative decision 234 may be ingested into device management process 236 to update operation of endpoint device 102A. In doing so, an updated data processing system may be obtained that provides updated computer implemented services, these updated services being desirable computer implemented services with regard to the field of use in which the updated data processing system (e.g., endpoint device 102A) operates.

Thus, by updating operation of a data processing system (e.g., 102A) using the benchmark-based update process, computer implemented services provided by the data processing system may be more likely to be both relevant and useful with regard to the field of use in which the data processing system operates, and/or may increase the relevancy and/or usefulness of services provided with regard to the field of use.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Thus, via data structures and interactions, as shown in FIGS. 2A-2D, management system 104 (shown and discussed with regard to FIG. 1), and/or other entities not explicitly shown in FIG. 1, may manage operation of data processing systems (e.g., endpoint device 102A, also shown in FIG. 1) to increase the likelihood of providing desired computer implemented services, the desired computer implemented services being services likely to be relevant to an industry sector in which the data processing systems operate. These services may be more likely to be relevant due to performing benchmark-based update processes based on filtering data as ascribed by a user of said systems and the industry sector ("field of use data").

As discussed above, the components of FIG. 1 may perform various methods to manage data processing systems. FIG. 3 illustrates methods that may be performed by the components of FIG. 1.

In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method for managing operation of a data processing system in accordance with an embodiment is shown. The method may be performed, for example, by a management system (e.g., 104) and/or any other entity.

At operation 300, telemetry data for the data processing system, filtering data indicating client ascribed levels of significance to benchmarks, and client ascribed field of use data for the data processing system is obtained. To do so, the management system may (i) receive this data via communication transmissions from another device (e.g., the data processing system), (ii) retrieve this data from local storage of the data processing system, (iii) generate this data based a current state of operations of the data processing system, and/or (iv) obtain this data via other processes.

For example, the telemetry data may be generated based on a current state of operation of the data processing system. This current state of the operation may be based on hardware and/or software components of the data processing system. For example, the hardware and/or the software components may facilitate functionalities of the data processing system, thereby causing computer implemented services to be provided. How these functionalities are facilitated may depend on operating states of the components themselves and may determine the current state of operation for the data processing system as a whole.

The operating states of these components may be based, at least in part, on (i) what quantity and/or quality of functionality is capable of being facilitated by a component, (ii) a configuration of the component that defines, at least in part, how the component may communicate and/or otherwise send and receive data from other devices operably connected to the data processing system, and/or (iii) how other components and devices may interact with the component. This information regarding these operating states of the hardware and/or software components may be referred to as hardware data and/or software data, respectively.

For example, the quantity and/or the quality of the functionality provided by the hardware components may be obtained based on hardware component metrics and/or component configuration data. The configuration data may allow for customization with regard to how a hardware component may communicate (e.g., via data transmissions) with both other hardware components and software components, and therefore may define such communication. The metrics may be based on a quantitative assessment of the hardware component defined by the configuration data and may thereby indicate the quantity and/or the quality.

For example, the metrics may be based on interactions between the hardware component and other components (and/or devices) operably connected to the data processing system, these interactions affecting processes performed by the component. Such interactions may, for example, provide enhanced security in some cases while providing avenues for vulnerabilities to be exploited in other cases.

Similarly, the quantity and/or the quality of the functionality provided by the software components may be obtained based on software version compliance data. Software version compliance data may indicate whether a version of a software component is in compliance to work in conjunction with an architecture of the data processing system, for example, to work in conjunction with the hardware component defined by the configuration data. Depending on whether the software component is in compliance, software security risks may be identified and may indicate various vulnerabilities subject to possible exploitation.

Additionally, for example, by utilizing recent hardware alerts and recent software alerts, additional information may be obtained regarding possible exploitation of such vulnerabilities by indicating effects on the operating states of the components (and the operating state of the data processing system as a whole) during their operation.

The filtering data may be ascribed (e.g., specified) by a client (e.g., a user of the data processing system) and may be used to identify levels of significance with regard to benchmarks performable for the data processing system.

For example, assume the client is in an industry that requires a high level of privacy and security for those receiving services from the industry. First benchmarks may be obtainable for the data processing system and may indicate a number of the vulnerabilities (e.g., identified using the software security risks). These first benchmarks may be ascribed to a high level of significance by the client. Additionally, second benchmarks may also be obtainable for the data processing system and may indicate processing speeds of the data processing system during operation. These second benchmarks may be ascribed to a level of significance lower than that of the first benchmarks.

This filtering data may thereby allow for a weighting of the benchmarks, thus providing a method for quantifying relevance of such benchmarks to the client as ascribed by the client.

The field of use data may be data specifying under what pretenses the data processing system is to be operating, these pretenses being indicated by an industry sector in which the data processing system operates to provide services. For example, assuming the client is associated (e.g., works in) with the banking industry, the industry sector in which the data processing system operates is the banking industry.

For additional information regarding the obtaining of telemetry data, filtering data, and/or field of use data, refer to FIG. 2A.

At operation 302, the benchmarks for the data processing system are obtained based on the telemetry data and benchmark criteria. The benchmarks may be obtained by performing an assessment on the data processing system using the telemetry data.

This assessment may quantify operation of the data processing system by providing results that associate various operations of components of the data processing system with, for example, numerical values that correspond to respective, quantifiable operation of the various operations. These results may be compared to benchmark criteria to determine whether the results indicate a satisfactory level of relevance and/or usefulness to the industry in which the data processing system operates.

For example, the benchmark criteria may specify that to be useful while operating in the banking industry, the data processing system must have no vulnerabilities that risk security and/or privacy of data. Therefore, should the results identify any of these vulnerabilities present in the operation of the data processing system, the benchmarks may indicate that the data processing system is not useful to the banking industry.

For additional information regarding the obtaining of benchmarks for the data processing system, refer to FIG. 2A.

At operation 304, the benchmarks are filtered based on the filtering data to obtain filtered benchmark data. The benchmarks may be filtered by weighting types of benchmarks based on the filtering data and as previously mentioned with regard to operation 300.

For additional information regarding the filtering of benchmarks, refer to FIG. 2B.

At operation 306, update data for the data processing system is obtained based on the filtered benchmark data and the client ascribed field of use data. The update data may be obtained by obtaining (i) actions to be performed to update the operation of the data processing system, the actions being associated with different filtered benchmarks of the filtered benchmark data, (ii) inferred changes in the benchmarks for each of the actions, (iii) standards for the benchmarks for the field of use, and/or (iv) recording the actions, the inferred changes, and the standards for the benchmarks to obtain the update data.

The actions to be performed to update the operation may be obtained from, for example, a database that associates various performable actions with different filtered benchmarks of the filtered benchmark data. For example, a lookup process may be performed using the filtered benchmarks to obtain respectively associated actions included in the database.

The inferred changes in the benchmarks may be obtained by (i) obtaining new telemetry data based on the actions, (ii) performing additional assessments (and filtering processes) using the new telemetry data to obtain new filtered benchmarks, (iii) comparing the filtered benchmarks to the new filtered benchmarks, and (iv) recording this comparison and the new filtered benchmarks to obtain the inferred changes.

The standards for the benchmarks may be obtained by using the field of use data to perform, for example, a lookup. For example, another database may include standard benchmarks for various processes with regard to an industry sector in which the various processes are performed. These standard benchmarks may be based on benchmark averages for entities within each field of use (e.g., entities within each industry sector) of fields of use for which the data processing system is usable (e.g., of any number of industry sectors in which the data processing system may operate.

For additional information regarding the obtaining of the update data, refer to FIG. 2C.

At operation 308, update of operation of the data processing system is initiated to obtain an updated data processing system that provides updated computer implemented services. The update of the operation may be initiated by sending the update data to a manager of operation of the data processing system.

For additional information regarding the update of the operation of the data processing system, refer to FIG. 2D.

The method may end following operation 308.

Thus, using the method illustrated in FIG. 3, embodiments disclosed herein may manage data processing systems to increase a likelihood of providing desired computer implemented services. These desired computer implemented services may be services that are likely to be relevant and useful to an industry sector in which the data processing systems providing the desired services are operating. For example, by filtering benchmarks as ascribed by a user (the user needing services relevant to the industry sector) of a data processing system, various processes may be facilitated to obtain recommendations that the user may (or may not) implement to update (or maintain) the data processing system, the recommendations being relevant due to being based on the filtered benchmarks and standards associated with the industry sector.

Figure 4:
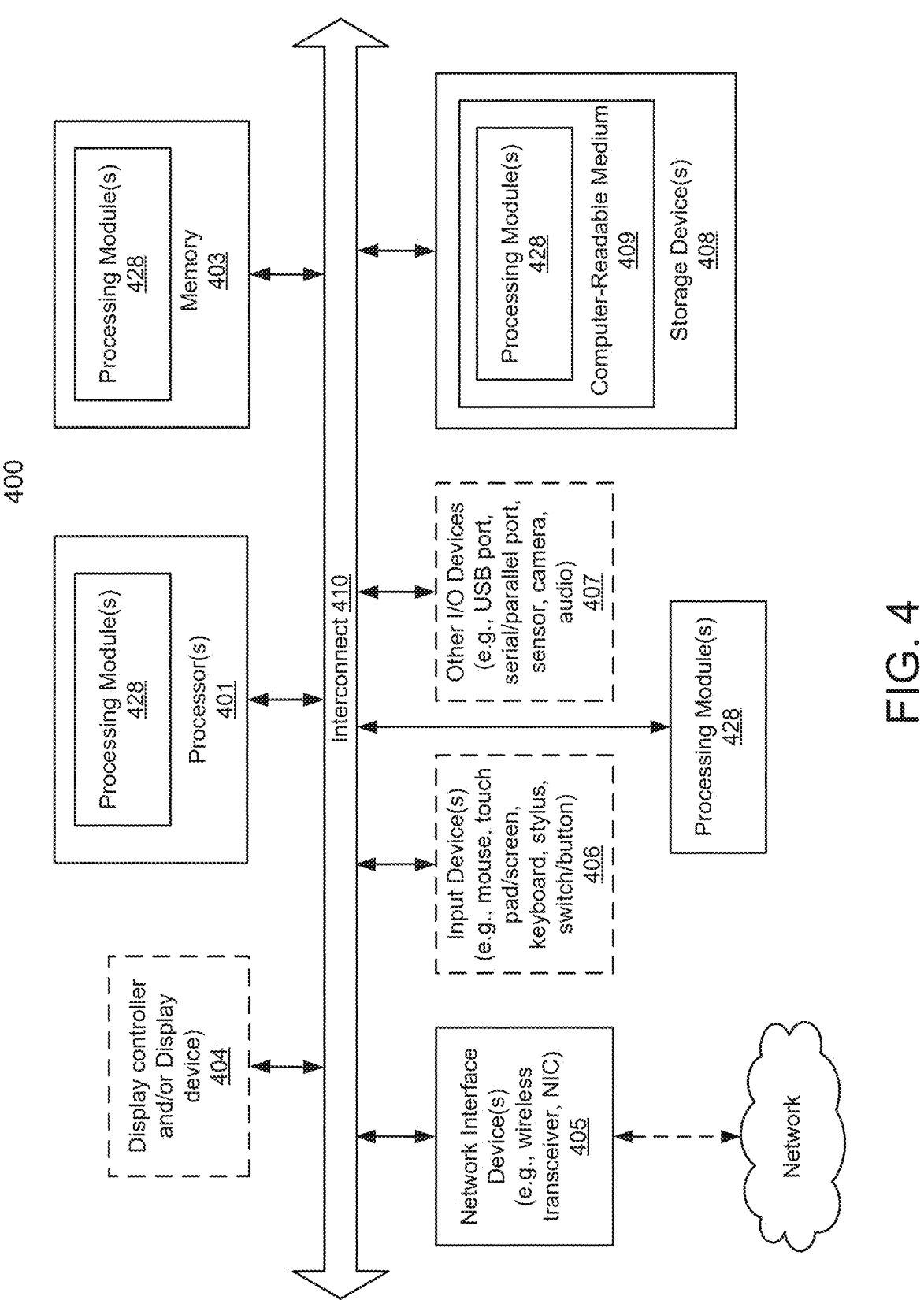
FIG. 4 shows a block diagram illustrating a data processing system in accordance with an embodiment.

Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/ logic 428 can be implemented in any combination hardware devices and software components.

Note that while system 400 is illustrated with various components of a data processing system, it is not intended to represent any particular architecture or manner of interconnecting the components as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a data processing system that provides computer implemented services, the method being performed by a computing device configured as a management system that manages the operation of the data processing system and comprising:

by a hardware processor of the management system:

obtaining:

telemetry data for the data processing system, filtering data indicating client ascribed levels of significance to benchmarks, and client ascribed field of use data for the data processing system;

obtaining, based on the telemetry data and benchmark criteria, the benchmarks for the data processing system;

filtering, based on the filtering data, the benchmarks to obtain filtered benchmark data;

obtaining, based on the filtered benchmark data and the client ascribed field of use data, update data for the data processing system, the update data comprising actions to be executed by the data processing system for modifying one or more hardware and/or software components of the data processing system; and modifying the one or more of the hardware and/or software components of the data processing system by causing the data processing system to execute at least one of the actions included in the update data to obtain an updated data processing system that provides updated computer implemented services for meeting the benchmarks.

2. The method of claim 1, wherein the telemetry data comprises at least one type of data selected from a group of types of data consisting of:

software data of the software components; and hardware data of the hardware components.

3. The method of claim 2, wherein the software data comprises:

software version compliance data;

software security risks; and recent software alerts.

4. The method of claim 2, wherein the hardware data comprises:

component configuration data;

component metrics; and recent hardware alerts.

5. The method of claim 1, wherein the field of use data indicates an industry in which the data processing system is used.

6. The method of claim 1, wherein filtering the benchmarks comprises weighting the benchmarks based on the filtering data.

7. The method of claim 1, wherein:

the actions being associated with different filtered benchmarks of the filtered benchmark data, and the update data further comprises:

inferred changes in the benchmarks for each of the actions; and standards for the benchmarks for the field of use.

8. The method of claim 7, wherein the standards for the benchmarks are based on benchmark averages for entities within each field of use of fields of use for which the data processing system is usable.

9. The method of claim 8, wherein causing the data processing system to execute the one or more of the actions included in the update data comprises:

sending, prior to the data processing system actually executing the one or more of the actions, the update data to a manager of operation of the data processing system.

10. The method of claim 9, wherein causing the data processing system to execute the one or more of the actions included in the update data comprises:

after sending the update data to the manager:

obtaining, from the manager and as a user input to the management system, the one or more of the actions to be executed by the data processing system to update the data processing system for meeting the benchmarks.

11. A non-transitory machine-readable medium having instructions stored therein, which when executed by a hardware processor of a computing device configured as a management system, cause the hardware processor to perform operations for managing operation of a data processing system that provides computer implemented services, the operations performed by the hardware processor comprising:

obtaining:

telemetry data for the data processing system, filtering data indicating client ascribed levels of significance to benchmarks, and client ascribed field of use data for the data processing system;

obtaining, based on the telemetry data and benchmark criteria, the benchmarks for the data processing system;

filtering, based on the filtering data, the benchmarks to obtain filtered benchmark data;

obtaining, based on the filtered benchmark data and the client ascribed field of use data, update data for the data processing system, the update data comprising actions to be executed by the data processing system for modifying one or more hardware and/or software components of the data processing system; and modifying the one or more of the hardware and/or software components of the data processing system by causing the data processing system to execute at least one of the actions included in the update data to obtain an updated data processing system that provides updated computer implemented services for meeting the benchmarks.

12. The non-transitory machine-readable medium of claim 11, wherein the field of use data indicates an industry in which the data processing system is used.

13. The non-transitory machine-readable medium of claim 11, wherein filtering the benchmarks comprises weighting the benchmarks based on the filtering data.

14. The non-transitory machine-readable medium of claim 11, wherein:

the actions being associated with different filtered benchmarks of the filtered benchmark data, and the update data further comprises:

inferred changes in the benchmarks for each of the actions; and standards for the benchmarks for the field of use.

15. The non-transitory machine-readable medium of claim 14, wherein the standards for the benchmarks are based on benchmark averages for entities within each field of use of fields of use for which the data processing system is usable.

16. A management system, comprising:

a hardware processor; and a memory coupled to the hardware processor to store instructions, which when executed by the processor, cause the hardware processor to perform operations for managing operation of a data processing system that provides computer implemented services, the operations performed by the hardware processor comprising:

obtaining:

telemetry data for the data processing system, filtering data indicating client ascribed levels of significance to benchmarks, and client ascribed field of use data for the data processing system;

obtaining, based on the telemetry data and benchmark criteria, the benchmarks for the data processing system;

filtering, based on the filtering data, the benchmarks to obtain filtered benchmark data;

obtaining, based on the filtered benchmark data and the client ascribed field of use data, update data for the data processing system, the update data comprising actions to be executed by the data processing system for modifying one or more hardware and/or software components of the data processing system; and modifying the one or more of the hardware and/or software components of the data processing system by causing the data processing system to execute at least one of the actions included in the update data to obtain an updated data processing system that provides updated computer implemented services for meeting the benchmarks.

17. The management system of claim 16, wherein the field of use data indicates an industry in which the data processing system is used.

18. The management system of claim 16, wherein filtering the benchmarks comprises weighting the benchmarks based on the filtering data.

19. The management system of claim 16, wherein:

the actions being associated with different filtered benchmarks of the filtered benchmark data, and the update data further comprises:

inferred changes in the benchmarks for each of the actions; and standards for the benchmarks for the field of use.

20. The management system of claim 19, wherein the standards for the benchmarks are based on benchmark averages for entities within each field of use of fields of use for which the data processing system is usable.

\* \* \* \* \*